(12) United States Patent
Dresselhaus et al.

(10) Patent No.: US 11,012,256 B2
(45) Date of Patent: May 18, 2021

(54) CONNECTION UNIT, MONITORING SYSTEM AND METHOD FOR OPERATING AN AUTOMATION SYSTEM

(71) Applicant: BECKHOFF AUTOMATION GMBH, Verl (DE)

(72) Inventors: Pascal Dresselhaus, Verl (DE); Sven Goldstein, Buende (DE); Hans Beckhoff, Verl (DE); Ralf Vienken, Gütersloh (DE)

(73) Assignee: Beckhoff Automation GmbH, Verl (DE)

( * ) Notice: Subject to any disclaimer, the term of this patent is extended or adjusted under 35 U.S.C. 154(b) by 57 days.

(21) Appl. No.: 16/149,988

(22) Filed: Oct. 2, 2018

(65) Prior Publication Data
US 2019/0036730 A1    Jan. 31, 2019

Related U.S. Application Data

(63) Continuation of application No. PCT/EP2017/059655, filed on Apr. 24, 2017.

(30) Foreign Application Priority Data

Apr. 22, 2016    (DE) ..................... 10 2016 107 491.8

(51) Int. Cl.
*G06F 15/16*    (2006.01)
*H04L 12/40*    (2006.01)
(Continued)

(52) U.S. Cl.
CPC .... *H04L 12/40032* (2013.01); *G05B 19/0428* (2013.01); *G05B 19/4185* (2013.01);
(Continued)

(58) Field of Classification Search
CPC ...... H04L 12/40032; H04L 2012/4026; G05B 19/0428; G05B 19/4185;
(Continued)

(56) References Cited

U.S. PATENT DOCUMENTS 7,246,194 B2 * 7/2007 Train ............... H04L 12/40013
                                        710/305
2003/0004586 A1 * 1/2003 O'Grady ............ G05B 19/4083
                                        700/19

(Continued)

FOREIGN PATENT DOCUMENTS

CN         101010645 A     8/2007
CN         101101699 A     1/2008
(Continued)

OTHER PUBLICATIONS

Opposition filed in European Patent Application 17718552.7, filed on Dec. 9, 2019, 245 pages including 3 pages of Notification of an Appeal, 22 pages of Cover Letter of Subsequent documents, 1 page of Request for documents, 219 pages of Subsequent documents.
(Continued)

*Primary Examiner* — Richard G Keehn
(74) *Attorney, Agent, or Firm* — Dorsey & Whitney LLP

(57) ABSTRACT

A connecting unit to transmit process data of an automation process of an automation system to an external data infrastructure, configured as a field device for arrangement on a field level of the automation system. The connecting unit comprises a field bus module, network module and interface module. The field bus module is configured to interchange the process data via the field bus with a signal unit connected to the automation process via a field connection. The network module is configured to interchange the process data with the external data infrastructure, use the data network to transmit input process data to the external data infrastructure, and retrieve output process data from the external data
(Continued)

infrastructure. The interface module is configured to interchange the process data between the field bus module and the network module. The interface module prompts interchange of the process data autonomously.

24 Claims, 4 Drawing Sheets

(51) Int. Cl.
*G05B 19/418* (2006.01)
*G05B 19/042* (2006.01)

(52) U.S. Cl.
CPC ............ *G05B 2219/31122* (2013.01); *G05B 2219/31123* (2013.01); *G05B 2219/31131* (2013.01); *G05B 2219/31348* (2013.01); *H04L 2012/4026* (2013.01); *Y02P 90/02* (2015.11)

(58) Field of Classification Search
CPC .......... G05B 2219/31122; G05B 2219/31348; G05B 2219/31123; G05B 2219/31131; Y02P 90/18
See application file for complete search history.

(56) References Cited

U.S. PATENT DOCUMENTS

| | | | |
|---|---|---|---|
| 2004/0139264 A1 | 7/2004 | Gros et al. | |
| 2004/0153594 A1* | 8/2004 | Rotvold | G05B 19/4186 710/305 |
| 2005/0066104 A1 | 3/2005 | Train et al. | |
| 2008/0249641 A1* | 10/2008 | Enver | G05B 19/4185 700/9 |
| 2009/0049215 A1 | 2/2009 | Nakamura | |
| 2016/0087812 A1 | 3/2016 | Pohlmann | |
| 2016/0147695 A1* | 5/2016 | Kroner | G05B 19/0425 710/306 |
| 2017/0177754 A1* | 6/2017 | Jin | G05B 19/4184 |
| 2017/0205792 A1* | 7/2017 | Ericsson | G05B 19/0426 |

FOREIGN PATENT DOCUMENTS

| | | |
|---|---|---|
| CN | 101321364 A | 12/2008 |
| CN | 101477362 A | 7/2009 |
| CN | 102142965 A | 8/2011 |
| CN | 102685134 A | 9/2012 |
| CN | 102739639 A | 10/2012 |
| CN | 103389697 A | 11/2013 |
| CN | 104995574 A | 10/2015 |
| CN | 105278489 A | 1/2016 |
| CN | 105357298 A | 2/2016 |
| DE | 19928517 A1 | 1/2001 |
| DE | 10252278 A1 | 5/2004 |
| DE | 102005051580 A1 | 5/2007 |
| DE | 102008019053 A1 | 10/2009 |
| DE | 202015104682 U1 | 9/2015 |
| DE | 202015104682 U1 | 10/2015 |
| WO | 2004010645 A1 | 1/2004 |
| WO | 2014177327 A1 | 11/2014 |
| WO | 2015198256 A3 | 3/2016 |

OTHER PUBLICATIONS

Opposition filed in European Patent Application 17718552.7, filed on Dec. 9, 2019, 26 pages including 3 pages of Notification of an Appeal, 22 pages of Cover Letter of Subsequent documents, 1 page of Request for documents.
English Translation of the Notification of an Appeal, Cover Letter of Subsequent Documents, and Request for documents contained in Opposition filed in European Patent Application 17718552.7, filed on Dec. 9, 2019, 30 pages.
First Office Action dated Aug. 27, 2020 in connection with Chinese Patent Application No. 201780024989.1, 24 pages including English translation.

* cited by examiner

CONNECTION UNIT, MONITORING SYSTEM AND METHOD FOR OPERATING AN AUTOMATION SYSTEM

CROSS-REFERENCE TO RELATED APPLICATIONS

This application is a continuation of PCT Application No. PCT/EP2017/059655, filed Apr. 24, 2017, which claims priority of German Patent Application DE 10 2016 107 491.8, filed Apr. 22, 2016, entitled VERBINDUNGSEIN-HEIT, ÜBERWACHUNGSSYSTEM UND VERFAHREN ZUM BETREIBEN EINES AUTOMATISIERUNGSSYS-TEMS and of PCT Application PCT/EP2017/059655, filed Apr. 24, 2017, entitled VERBINDUNGSEINHEIT, ÜBER-WACHUNGSSYSTEM UND VERFAHREN ZUM BETREIBEN EINES AUTOMATISIERUNGSSYSTEMS, each of which are incorporated by reference herein, in their entirety and for all purposes.

FIELD

The present invention relates to a connecting unit for an automation system, a monitoring system having a connecting unit for an automation system and a method for operating an automation system.

BACKGROUND

In general, the invention is concerned with the connection of an automation system to an external data infrastructure. The invention can in particular be used in automation systems for industrial automation, for buildings and air-conditioning automation, for stage technology, for energy technology or for traffic management technology. Within the context of industrial automation, the automation system can control presses, packaging machines or installations for performing chemical processes, for example, and within the context of buildings automation, it can control heating and ventilation systems, solar protection systems or access systems of a building, for example. Automation systems can be used in energy technology, inter alia in wind power installations, photovoltaic systems, biomass power stations or in energy recording systems. The examples cited here are not intended to be regarded as a conclusive list and do not restrict the scope of protection of the present invention.

Automation systems are used for controlling automation processes. An automation process normally comprises reading in input data that characterize the state of the automation process and are based on measured values captured by sensors. The sensors may be configured as switches, temperature sensors, pressure sensors or light barriers, for example. The input data can comprise temperature values, pressure values or switching states measured by the sensors. The input data form the basis, normally by a control unit of the automation system, for creating output data that are used to control the automation process. The output data normally represent control values for actuators of the automation system. The actuators may be configured as relays, motors or valves, for example. The control values can comprise a motor current, a motor speed, a switching voltage or a switching current.

The measured values are normally read in from the sensors in the form of input signals by signal units and converted into input data in the signal units. Analogously, the signal units convert the output data into control values and output the control values to the actuators as output signals. The input and output signals can also be referred to generally as field signals. The field signals may be voltage signals, current signals, digital data signals or regulated currents and voltages, for example.

The signal units have field connections for connecting the sensors and actuators, and for input or output of the field signals. They are normally connected to the control unit of the automation system via a data line, for example via a field bus. The data line is used to transmit the read-in measured values as input data from the signal units to the control unit for further processing and transfer the control values provided by the control unit as output data to the signal units. In such a case, the signal units are configured to perform a conversion between the input and output data circulating on the data line and the field signals.

Automation systems can be divided onto a field level and a control level. The field level comprises all the components of the automation system that are normally arranged close to the process, that is to say on or in proximity to a controlled installation, machine or other technical facility, and are used for forwarding or converting the input and output data, and also the field signals. Inter alia, the field level comprises the signal units and the sensors and actuators connected to the signal units. The control level comprises the control unit and all other control devices receiving the control data captured on the field level and processing them to produce output control data for output onto the field level. The field level and the control level are normally connected to one another by one or more data lines.

The control unit of the automation system is able not only to process the input and output data for the purpose of controlling the automation process but also to forward them from the automation system to an external data infrastructure. The external data infrastructure may be a computer system providing data-based services as what is known as a "cloud". The data-based services can comprise storage of the data for later use or evaluation or analysis of the data. This allows an energy consumption, a temperature or other physical parameters of the automation system, for example, to be recorded.

In comparison with storage and analysis of the input and output data in the control unit, forwarding to an external data infrastructure affords the advantage that storage and analysis of the data does not require any hardware resources of the control unit to be used and the data or the results of the analysis can be forwarded to other units that are likewise connected to the external data infrastructure. Moreover, the data from multiple control units in a distributed arrangement of one or more automation systems can be brought together and combined in the external data infrastructure.

The computer systems of the external data infrastructure may be connected to the automation system either via a local area and/or private data network or else via a worldwide and/or fundamentally public data network, for example the Internet. External data infrastructures accessible via the Internet are provided as cloud services by various Internet companies, inter alia.

Connecting the control unit of the automation system to the external data network requires computation capacities of the control unit to be used for forwarding the input and output data, said computation capacities then no longer being available for the actual control of the automation process.

SUMMARY

The invention provides an improved connecting unit, an improved monitoring system and an improved method for operating an automation system for connecting of an automation system to an external data infrastructure.

According to one aspect, a connecting unit is configured to transmit process data of an automation process of an automation system to an external data infrastructure. The connecting unit is configured as a field device for arrangement on a field level of the automation system. The connecting unit comprises a field bus module, a network module and an interface module. The field bus module is connectable to a field bus and is configured to interchange the process data via the field bus with a signal unit connected to the automation process via a field connection. The network module is connectable to an external data network and is configured to interchange the process data via the external data network with the external data infrastructure and in so doing to use the data network to transmit input process data to the external data infrastructure and to retrieve output process data from the external data infrastructure. The interface module is connected to the network module and to the field bus module for an interchange of the process data between the field bus module and the network module. The interface module is configured to prompt the interchange of the process data between the network module and the external data infrastructure autonomously.

According to another aspect, a monitoring system for arrangement on a field level of an automation system has a connecting unit for transmitting process data of an automation process of the automation system to an external data infrastructure and a signal unit. The signal unit is configured to be connected to the automation process via a field connection. A field bus interface of the signal unit is configured to be connected via a field bus to the connecting unit for the purpose of the interchange of the process data.

According to another aspect, a method for operating an automation system having a connecting unit for transmitting process data of the automation system between a signal unit, which is connected via a field connection to an automation process of the automation system, and an external data infrastructure, comprises the following steps: Interchanging the process data between the connecting unit and the signal unit via a field bus, autonomously prompting an interchange of the process data between the connecting unit and the external data infrastructure via an external data network by the connecting unit, wherein the interchange of the process data is prompted by means of provision and/or by means of retrieval of a network message comprising the process data by the connecting unit.

EMBODIMENTS

A connecting unit for transmitting process data of an automation process of an automation system to an external data infrastructure is configured as a field device for arrangement on a field level of the automation system. The connecting unit comprises a field bus module, a network module and an interface module. The field bus module is connectable to a field bus and is configured to interchange the process data via the field bus with a signal unit connected to the automation process via a field connection. The network module is connectable to an external data network and is configured to interchange the process data via the external data network with the external data infrastructure. The interface module is connected to the network module and to the field bus module for an interchange of the process data between the field bus module and the network module and is configured to prompt the interchange of the process data between the network module and the external data infrastructure autonomously.

As a result of the connecting unit prompting the interchange of the process data with the external data infrastructure autonomously, the interchange of the process data can be effected in particular independently of the control of the automation process. It is also possible for the interchange of the process data to be effected independently of a control unit of the automation system and also independently of all other control units in the automation system. This means that advantageously no resources for controlling the automation process, in particular no computation capacities of the control unit, are used for transmitting the process data to the external data infrastructure.

Since the connecting unit is configured as a field device, the connecting unit merely forwards the process data, without logically combining them to control the automation process. This means that a monitoring system comprising the connecting unit and the signal unit and the control of the automation process are advantageously able to be configured to be functionally independent of one another. This avoids potentially safety-critical failure of the control of the automation process in the event of disturbances in the connecting unit or the external data infrastructure.

As a result of the connecting unit autonomously prompting the interchange of the process data by the external data network, the connecting unit can advantageously interchange the process data with the external data infrastructure exclusively via data connections emanating from the connecting unit. This facilities protection of the automation system by means of a firewall between the connecting unit and the external data network.

In a development of the connecting unit, the interface module is configured to prompt the interchange of the process data periodically and/or on the occurrence of an event stored in the connecting unit. In a development of the connecting unit, the field bus module is configured to interchange the process data via the field bus periodically with the signal unit. This allows the interchange of the process data via the field bus and the interchange of the process data via the external data infrastructure to be temporally decoupled. In particular, the volume of process data transmitted via the external data network can be matched to the bandwidth of the access of the connecting unit to the external data network and, by way of example, can be reduced in comparison with the volume of process data interchanged via the field bus.

In a development of the connecting unit, the field bus module comprises a configuration module configured to prompt polling of the signal unit connected to the field bus and to make configuration data relating to the signal unit available. This advantageously allows automated polling and provision of the configuration data by the connecting unit.

A development of the connecting unit has a server module connected to the network module and configured to make configuration data of the connecting unit available to an access module of an external computer connected to the network module via the external data network. The connecting unit is configured to configure the field bus module and/or the field bus and/or the signal unit and/or the interface module on the basis of the configuration data. This allows the configuration of the connecting unit and of the signal unit to be ascertained and altered in a simple manner via the external data network.

In a development of the connecting unit, the field bus module is configured to interchange the process data in a field bus data format via the field bus, and the network module is configured to transmit the process data in a network data format via the external data network. The connecting unit has a conversion module configured to convert the process data between the field bus data format and the network data format. As a result, it is advantageously possible for different data formats to be used in each case for transmitting the process data via the field bus and the external data network. In particular, the process data can be transmitted via the field bus in a binary data format and via the external data network in a plain-text data format.

A development of the connecting unit has a memory module configured to buffer-store the process data after reception via the field bus and before sending via the external data network. This advantageously allows the process data to be buffer-stored in the connecting unit in the event of termination of the data connection between the connecting unit and the external data infrastructure, and, after restoration of the data connection, to be sent collectively to the external data infrastructure.

In a development of the connecting unit, the interface module comprises a transmission module, wherein the transmission module is configured to prompt interchange of the process data by opening a transmission channel via the network module, in order to send a network message comprising the process data.

In a development of the connecting unit, the interface module has a reception module, wherein the reception module is configured to prompt interchange of the process data by opening a reception channel via the network module, in order to retrieve a network message comprising the process data.

As a result of the connecting unit prompting the interchange of the process data by means of the opening of the transmission channel and the reception channel, it is an advantageously simple matter for an autonomous interchange of the process data between the connecting unit and the external data infrastructure to be realized. An interchange of the process data by means of network messages allows a platform-independent and temporally decoupled interchange of the process data between the connecting unit and the external data infrastructure, for example using a message distribution module in the external data network.

In a development, the connecting unit has a realtime system and an application system, wherein the realtime system comprises the interface module and the field bus module and the application system comprises the network module. The realtime system can provide a realtime environment allowing the deterministic execution of time-critical processes, for example. The application system can comprise all the modules whose execution timing is uncritical. The use of a realtime system and an application system in the connecting unit allows the interchange of the process data via the external data network to be temporally decoupled from the transmission of the process data via the field bus. Moreover, for the transmission of the process data via the field bus, it is possible for a field bus protocol to be used whose execution presupposes a realtime environment.

A monitoring system for arrangement on a field level of an automation system comprises a connecting unit for transmitting process data of an automation process of the automation system to an external data infrastructure, and a signal unit. The signal unit is configured to be connected to the automation process via a field connection. A field bus interface of the signal unit is configured to be connected via a field bus to the connecting unit for the purpose of interchanging the process data.

In a development of the monitoring system, the field connection of the signal unit is configured as a further field bus interface. The further field bus interface is configured to be connected to an installation field bus of the automation system, in order to concurrently log installation field bus data interchanged on the installation field bus as process data. This advantageously allows the installation field bus data to be transferred as process data via the connecting unit to the external data infrastructure, without putting a strain on computation capacities of a control unit of the automation system.

A method for operating an automation system having a connecting unit for transmitting process data of the automation system between a signal unit, which is connected via a field connection to an automation process of the automation system, and an external data infrastructure comprises interchanging the process data between the connecting unit and the signal unit via a field bus. Moreover, the method comprises the connecting unit autonomously prompting an interchange of the process data between the connecting unit and the external data infrastructure via an external data network.

In a development of the method, the interchange of the process data is prompted by means of provision and/or by means of retrieval of a network message comprising the process data by the connecting unit.

A development of the method comprises the further step of creating input process data, representing a state of the automation process executed by the automation system, in the signal unit. Moreover, the method comprises transmitting the input process data as process data from the signal unit to the connecting unit as part of the interchange of the process data via the field bus and transmitting the process data from the connecting unit to the external data infrastructure as part of the interchange of the process data via the external data network. The transmission of the process data to the external data infrastructure advantageously allows the process data to be stored in the external data infrastructure, to be analyzed or to be processed further, and the process data or the results of the analysis to be made available to further computation units, in particular mobile devices, via the external data network.

A development of the method comprises the signal unit concurrently logging installation field bus data circulating on an installation field bus connected to the signal unit, and providing the concurrently logged installation field bus data as the input process data representing a state of the automation process in the signal unit.

A development of the method comprises the external data infrastructure providing output process data as process data and the connecting unit retrieving the output process data from the external data infrastructure as part of the interchange of the process data via the external data network. Such a method advantageously allows a bidirectional data interchange between the connecting unit and the external data infrastructure via the external data network.

A development of the method comprises transmitting the output process data from the connecting unit to the signal unit as part of the interchange of the process data via the field bus, and the signal unit influencing the automation process on the basis of the output process data. Such a method advantageously allows computation capacities made available by the external data infrastructure to be used for actuating actuators connected to the signal unit. Moreover, the actuators connected to the signal unit can advantageously be actuated on the basis of input data provided by arbitrary units connected to the external data network.

A development of the method comprises adapting the configuration of the connecting unit on the basis of the output process data retrieved by the connecting unit. This allows the external data infrastructure, for example in response to an evaluation of input process data transferred by the connecting unit or to an inquiry by a receiver of the process data that is transferred to the external data infrastructure, to obtain, in automated fashion, an adaptation of the transfer of the input process data, for example for the purpose of capturing the input process data at shorter intervals of time for more accurate recording of the state of the automation process.

A development of the method comprises the external data infrastructure providing output process data as process data, a control unit of the automation system retrieving the output process data from the external data infrastructure, and the control unit influencing the automation process on the basis of the output process data. This advantageously allows input process data captured by the signal unit and evaluated and processed in the external data infrastructure to be used for controlling the automation process.

BRIEF DESCRIPTION OF THE DRAWINGS

The invention will be discussed in more detail below on the basis of figures. Here, in a schematic illustration in each case.

DETAILED DESCRIPTION

Figure 1:
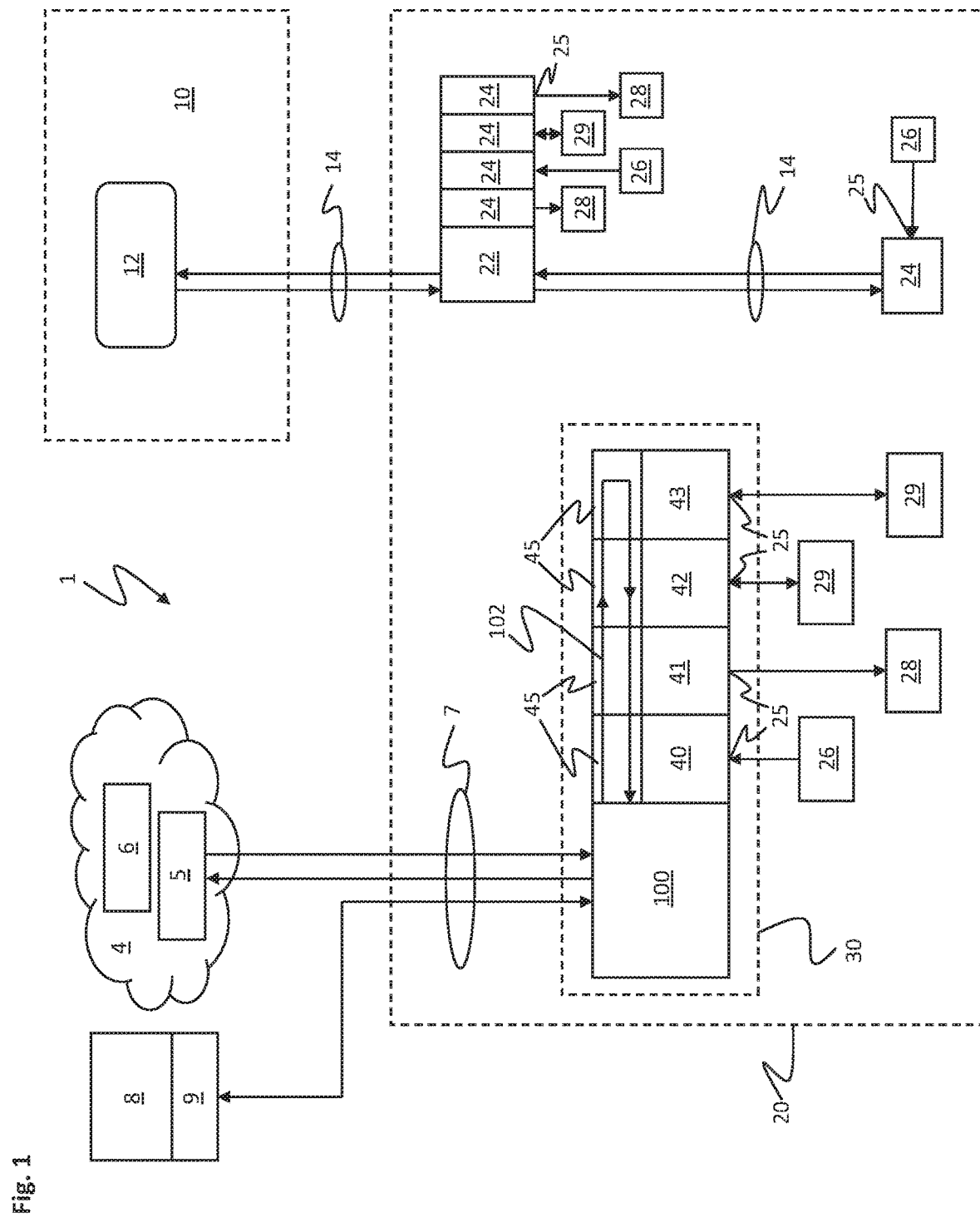
FIG. 1 shows a first automation system having a first monitoring system comprising a connecting unit.

FIG. 1 shows a first automation system 1 for controlling an automation process. The first automation system 1 has a control unit 12 and multiple installation signal units 24. The installation signal units 24 are connected via field connections 25 to sensors 26, actuators 28 or sensor-actuator units 29 of the first automation system 1. The field connections 25 and the sensors 26, the actuators 28 and the sensor-actuator units 29 connect the installation signal units 24 to the automation process. The sensors 26, the actuators 28 and the sensor-actuator units 29 may be arranged on an installation or machine controlled by the first automation system 1, for example.

The field connections 25 are used by the installation signal units 24 and the sensors 26, the actuators 28 and the sensor-actuator units 29 to interchange field signals that, for example as input signals, represent a measured value that has been captured by one of the sensors 26 or one of the sensor-actuator units 29 and characterizes the state of the automation process. As output signals, the field signals are, by way of example, an electrical signal that actuates one of the actuators 28 or one of the sensor-actuator units 29 and thus influences or alters the state of the automation process. The sensor-actuator units 29 thus interchange both input signals and output signals with the installation signal units 24.

The control unit 12 and the installation signal units 24 are connected to one another via an installation field bus 14. The installation field bus 14 is a data line for the interchange of control data for controlling the automation process. The installation field bus 14 may be based on the EtherCAT, Profibus or CAN bus standard, for example. The control data interchanged via the installation field bus 14 between the control unit 12 and the installation signal units 24 comprise input data, representing the measured values captured by the installation signal units 24, and output data, representing the control data to be transmitted to the installation signal units 24. In the installation signal units 24, a conversion is effected between the control data on the installation field bus 14 and the field signals interchanged with the sensors 26, actuators 28 and sensor-actuator units 29.

The installation signal units 24 may either be connected directly to the installation field bus 14 or be connected to the installation field bus 14 via a coupling unit 22. In the case of a connection via the coupling unit 22, the relevant installation signal units 24 are connected to the coupling unit 22 via a data line and the coupling unit 22 forwards the control data circulating on the installation field bus 14 to the installation signal units 24 connected to the coupling unit. The data line between the coupling unit 22 and the installation signal units 24 may likewise be configured as a field bus, for example.

The control unit 12 acts as a superordinate control unit that reads in the input data, which characterize the state of the automation process and are based on the input signals captured by the sensors 26, for example, and processes them further to produce the output data, which prompt a change in the state of the automation process by virtue of the output signals output to the actuators 28. To produce the output data, the input data are logically combined with one another according to a control program running on the control unit 12.

The first automation system 1 can be divided onto a control level 10 and a field level 20. In this case, the field level 20 comprises all the devices and units of the automation system 1 that read in and output, forward and possibly convert to one another the field signals and control data required for controlling the automation process. Normally, the devices of the field level 20 are arranged close to the field on the machines or installations to be controlled by the automation process. The field level 20 comprises in particular the signal units 24, the sensors 26, the actuators 28, the sensor-actuator units 29 and the coupling unit 22. The devices of the field level 20 form field devices of the automation system 1.

The control level 10 comprises all the devices and units that process and logically combine input data of the sensors 26, 29, characterizing the state of the automation process, to produce output data for the actuators 28, 29. In particular, the control level 10 comprises all the devices and units on which control programs for controlling the automation process run, for example the control unit 12.

Normally, the devices of the field level 20 and the devices of the control level 10 are arranged so as to be physically separate from one another. The devices of the control level 10 may alternatively be arranged in direct proximity to the devices of the field level 20. In such a case, the field level 20 and the control level 10 can be functionally delimited from one another to the effect that the devices of the control level 10 process control data, for example logically combine input data, in order to produce output data, whereas although the devices of the field level 20 forward control data and field signals, they do not logically combine them with one another.

In the first automation system 1 depicted in FIG. 1, the devices of the control level 10 and the devices of the field level 20 are arranged so as to be physically separate from one another in separate housings. In other embodiments of the first automation system 1, the devices of the control level 10 and of the field level 20, that is to say in particular the control unit 12 and the signal units 24, may be integrated in a single device, in particular in a shared housing.

The field level 20 of the first automation system 1 has not only the signal units 24 but also a first monitoring system 30 according to the invention, as a field device, arranged on it. The monitoring system 30 is configured to interchange process data of the automation process controlled by the control unit 12 with an external data infrastructure 4. To this end, the monitoring system 30 comprises, likewise as field devices, a connecting unit 100 and a first signal unit 40, a second signal unit 41, a third signal unit 42 and a further third signal unit 43.

The process data of the automation process that are interchanged between the signals units 40, 41, 42, 43 and the external data infrastructure 4 may be, like the input and output data interchanged between the control unit 12 and the installation signal units 24, incoming process data, or input process data, or outgoing process data, or output process data. As input process data, the process data are transmitted from the signal units 40, 41, 42, 43 to the external data infrastructure 4, the process data being able to depict a state or a physical parameter of the automation process, for example a temperature, a pressure or a switch state. As output process data, the process data are transmitted from the external data infrastructure 4 to the signal units 40, 41, 42, 43, the process data being able to depict data to be output to the automation process, for example for the purpose of actuating an actuator. The input process data thus correspond to the input data sent by the installation signal units 24 on the installation field bus 14, and the output data correspond to the output data received by the installation signal units 24 via the installation field bus 14.

The first signal unit 40 of the first monitoring system 30 has a sensor 26 connected to it via a field connection 25, which sensor is connected to the automation process, for example is arranged on a controlled installation or machine, and captures measured values that are supposed to be transmitted to the external data infrastructure 4. The sensor 26 can record a pressure, a temperature, an energy consumption or a vibration, for example. The second signal unit 41 has an actuator 28 connected to it via a field connection 25, which actuator, like the sensor 26, is connected to the automation process and can influence the automation process on the basis of control values. The actuators may be configured as valves, relays or motors, for example. The third signal units 42, 43 each have sensor-actuator units 29 connected to them that can both capture measured values and be influenced by control values. For the purpose of connecting the sensors and actuators, the field connections 25 of the signal units 40, 41, 42, 43 are configured as digital and/or analog inputs and/or outputs. The measured and control values are transmitted via the field connections 25 in the form of input and output signals.

The connecting unit 100 is arranged on the field level 20 of the first automation system 1 and configured as a field device. As such, the connecting unit 100 is configured to forward the process data between the signal units 40, 41, 42, 43 and the external data infrastructure 4, but it is not used to control the automation process. In particular, it does not form any logic combination of the process data for the purpose of process control.

The signal units 40, 41, 42, 43 and the connecting unit 100 are connected to one another via a field bus 102 for the purpose of interchanging the process data. The connecting unit 100 and the external data infrastructure 4 are connected via an external data network 7 for the purpose of interchanging the process data.

The connecting unit 100 can be used to transmit the process data between the signal units 40, 41, 42, 43 and the external data infrastructure 4. In this case, the transmission of the process data comprises an interchange of the process data between the connecting unit 100 and the signal units 400, 41, 42, 43 via the field bus 100. Moreover, the transmission of the process data comprises an interchange of the process data between the connecting unit 100 and the external data infrastructure 4 via the external data network 7. The interchange of the process data via the external data network 7 is prompted by the connecting unit 100 actively and autonomously in this case. In particular, the interchange of the process data via the external data network 7 or the reading-in and output of the process data by the field bus 102 is prompted by the connecting unit 100 independently of the control unit 12. The field signals representing the measured values and the control values are also read in and output by the monitoring system 30 autonomously and in particular independently of the control unit 12 and/or the installation signal units 24.

The interchange of the process data via the field bus 102 and via the external data network 7 comprises in each case both transmission of input process data from the signal units 40, 41, 42, 43 via the connecting unit 100 to the external data infrastructure 4 and transmission of output process data from the external data infrastructure 4 via the connecting unit 100 to the signal units 40, 41, 42, 43.

Before the data interchange, the signal unit 40 reads in the input signals, representing the state of the automation process controlled by the first automation system 1, from the sensor 26 via the field connection 25. The first signal unit 40 takes the input signals read in as a basis for creating process data as input process data that likewise represent the state of the automation process executed by the automation system. The first signal unit 40 transmits the input process data via the field bus 102 to the connecting unit 100 as part of the interchange of the process data. After reception via the field bus 102, the connecting unit 100 transmits the process data via the external data network 7 on to the external data infrastructure 4.

The external data infrastructure 4 can provide data-based services as what is known as a "cloud". For this, the external data infrastructure 4 can perform a data service 6 that processes, for example stores, analyzes or otherwise evaluates, the process data transferred to the external data infrastructure 4. The external data infrastructure 4 can also provide multiple data services 6. The external data infrastructure 4 may be configured to make the process data or the results of the analysis or processing available to a further application, for example an application running on a further computer or a mobile terminal, via the external data network 7. The process data can also be analyzed or processed on the external data infrastructure 4 by means of machine learning or data mining methods.

The external data infrastructure 4 may also be configured to provide process data as output process data. The output process data can be created, by way of example, by the data service 6 on the basis of the input process data previously transferred by the signal unit 4, in order to influence the state of the automation process. In this way, control functions of the automation process can be executed on the external data infrastructure 4, for example. The output process data may also have been created on the basis of data that are made available to the external data infrastructure 4 by other units, for example by further connecting units or by a control unit, via the external data network 7, however.

The output process data can be retrieved from the external data infrastructure 4 by the connecting unit 100 as part of the interchange of the process data between the external data infrastructure 4 and the connecting unit 100. The process data are then transmitted via the external data network 7 to the connecting unit 100 for reception.

By way of example, the output process data can be provided by the external data infrastructure 4 for the purpose of actuating the actuator 28 connected to the second signal unit 41. The connecting unit 100 can transmit the process data via the field bus 102 to the second signal unit 41 as part of the interchange of the process data. The second signal unit 41 receives the output process data via the field bus 102 and influences the automation process on the basis of the output process data. By way of example, the second signal unit 41 can use its field connection 25 to actuate the actuator 28 by means of output signals created on the basis of the output process data.

The sensor-actuator units 29 connected to the third signal units 42, 43 can firstly, as sensors, read in input signals and secondly, as actuators, they can be actuated by means of output signals. Like the first signal unit 40, the third signal units 42, 43 convert the input signals into input process data for transfer to the external data infrastructure 4 and forward the input process data via the field bus 102 to the connecting unit 100. Like the second signal unit 41, the third signal units 42, 43 receive the output process data, convert them into output signals and output the output signals to the sensor-actuator units 29.

The connecting unit 100 and the signal units 40, 41, 42, 43 are configured to transmit the process data via the field bus 102 according to a stipulated field bus protocol or standard. The field bus standard may be the EtherCAT, Profibus, Interbus or CAN bus standard, for example. The field bus 102 for transmitting the process data to the connecting unit 100 and the installation field bus 14 for transmitting the control data may be based on the same or different field bus protocols and standards. For connection to the field bus 102, the signal units 40, 41, 42, 43 each have a field bus interface 45 implementing the respective standards and protocols.

The external data network 7 may be a wired network, for example an Ethernet network, or a radio-based network for example. The external data infrastructure 4 can be based on a local computer system arranged in proximity to the first automation system 1. In this case, the external data network 7 can comprise or consist of a local area network, for example. The external data infrastructure 4 can also be based on a remote computer system. The external data network 7 can also comprise the Internet in this case, so that the external data infrastructure 4 may be arranged worldwide in principle.

The interchange of the process data between the connecting unit 100 and the external data infrastructure 4 or the data service 6 can be effected by means of a reciprocal interchange of network messages. The interchange of the network messages can be coordinated by a message distribution module 5. In this case, the network messages do not have to be interchanged directly between the distribution module 5 and the data service 6 or another application receiving the process data. Instead, the connecting unit 100 and the data service 6 or the further application could interchange the network messages having the process data with the message distribution module 5 in each case, said message distribution module then undertaking the forwarding of the network messages to the respective receiver.

The connecting unit 100 and the data service 6 or the further application are thus not coupled to one another directly, but rather communicate with one another only indirectly via the message distribution module 5. This allows temporally and spatially decoupled operation of the connecting unit 100 as sender of the network messages and the receivers of the network messages. This message distribution module 5 may be configured to allow a platform- and operating-system-independent interchange of the network messages.

The message distribution module 5 can provide a message queue for the network messages. It may also comprise what is known as a "message broker", which validates, converts and/or forwards the network messages. The message distribution module 5 can be embodied as a software application on the external data infrastructure 4. The message distribution module 5 may be what is known as message-oriented middleware, for example. The interchange of the network messages containing the process data with the message distribution module 5 can be effected using the MQTT protocol or the AMQP protocol, for example.

The connecting unit 100 and the first automation system 1 may be configured so that the connecting unit 100 prompts the interchange of the process data via the external data network 7. This comprises both sending the input process data to and receiving the output process data from the external data infrastructure 4. This can involve both the input process data and the output process data each being interchanged via the external data network 7 via data connections emanating from the connecting unit 100. By way of example, the sending of the input process data via the external data network 7 to the external data infrastructure 4 can be prompted by virtue of the connecting unit 100 making the input process data available for sending. This involves the connecting unit 100 acting as an active sender of the output process data that actively prompts sending of the process data itself. The receiving of the output process data via the external data network 7 can be prompted by the connecting unit 100 by virtue of the connecting unit 100 retrieving the output process data via the external data network. This involves the connecting unit 100 acting as an active receiver of the output process data that actively prompts reception of the process data itself.

As such, the sending of the network messages having the process data from the connecting unit 100 to the external data infrastructure 4 can be prompted by the connecting unit 100. By way of example, the connecting unit 100 can provide the network message having the input process data for a transmission via the external data network 7. The network message can be provided to the message distribution module 5, for example, for transmission to other units or applications. The connecting unit 100 may be configured to characterize the process data to be sent as what is known as a publisher on the basis of general criteria.

The reception of the network messages having the process data by the connecting unit 100 from the external data infrastructure 4 can also be prompted by the connecting unit 100. By way of example, the connecting unit 100 can retrieve the network messages from the external data infrastructure 4. The network message can be retrieved from the message distribution module 5, for example. The connecting unit 100 can specify the process data to be received as what is known as a subscriber likewise just on the basis of general criteria.

The criteria characterizing the process data to be sent or to be received by the connecting unit 100 may in each case be the measured or controlled variables represented by the process data or the manner in which they are obtained, in particular the signal units 40, 41, 42, 43 associated with them, for example.

The interchange of the process data via the field bus 102 can be effected between the connecting unit 100 and the signal units 40, 41, 42, 43 periodically at stipulated first intervals of time. The periodic interchange of the process data can comprise the reception of the input process data and/or the sending of the output process data by the connecting unit 100.

For the periodic interchange of the process data, the connecting unit 100 can be configured to periodically create a data message and to transmit it via the field bus 102 to the signal units 40, 41, 42, 43. The field bus 102 may be configured as a ring bus on which the data message passes through the signal units 40, 41, 42, 43 in order and is subsequently returned to the connecting unit 100. The first, third and further third signal units 40, 42, 43 can insert the input process data that they have created on the basis of the field signals read in via their field connections 25 into the data message created by the connecting unit 100, in order to send the process data to the connecting unit 100. Additionally, the connecting unit 100 can insert the output process data that are supposed to be forwarded to the second, third and further third signal units 41, 42, 43 into the created data message as process data. The second, third and further third signal units 41, 42, 43 may be configured to take the process data intended for them for actuating the actuators 28, 29 connected to the field connections 25 from the circulating data message.

The connecting unit 100 is configured to interchange the process data with the external data infrastructure 4 in automated fashion, in particular independently of the control of the automation process by the control unit 12. Moreover, the interchange of the process data between the connecting unit 100 and the external data infrastructure 4 requires no polling of the connecting unit 100, in particular no polling by an application, such as of the data service 6, processing the process data.

The interchange of the process data via the external data network 7 can be effected between the connecting unit 100 and the external data infrastructure 4 likewise periodically at stipulated second intervals of time. The periodic interchange of the process data can comprise the sending of the input process data and/or the receiving of the output process data by the connecting unit 100. In this case, the second intervals of time may be consistent with the first intervals of time for transmitting the process data via the field bus 102. The second intervals of time may alternately be shorter or longer than the first intervals of time. The connecting unit 100 may be configured to buffer-store the process data and to transmit them possibly collectively via the external network 7 or the field bus 102.

The interchange of the process data via the external data network 7 may alternatively be effected under event control. In this case, the connecting unit 100 may be configured to check the occurrence of a predetermined event stored in the connecting unit 100. The predetermined event may consist, by way of example, in a measured value transmitted to the connecting unit 100 as a process datum exceeding or dropping below a predetermined limit value. The event may also consist in a measured value transmitted as a process datum changing in a predetermined manner, for example over time. The predetermined event may also comprise an external signal reaching the connecting unit 100.

On an occurrence of the stored event, the connecting unit 100 prompts the interchange of the process data via the external data network 7. The interchange can comprise sending the input process data that have been received from the connecting unit 100 via the field bus 102 and receiving the output process data for forwarding via the field bus 102. An event-controlled interchange of the process data with the external data infrastructure 4 can also involve the connecting unit 100 being configured to buffer-store the process data and to transmit them possibly collectively via the external data network 7 or the field bus 102.

The first monitoring system 30 may be configured to be parameterized or configured via the external data network 7. This can comprise both configuration of the connecting unit 100 and configuration of the signal units 40, 41, 42, 43.

The configuration of the connecting unit 100 can comprise, by way of example, settings for the software modules and data services that are needed for communication with the external data infrastructure 4, in particular with the message distribution module 5. The configuration can be used to stipulate the external data infrastructure 4 to which the connecting unit 100 is supposed to connect, for example. In particular, the configuration can be used to determine the message distribution module 5 and the access data thereof. The configuration can also be used to stipulate the protocols for communication with the message distribution module 5.

If certificates or a Firewall are used for protecting the communication between the connecting unit 100 and the external data infrastructure 4, the configuration can also involve the handling of the certificates and the settings of the Firewall being stipulated. It is also possible for the configuration to involve passwords being stored, for example. The first monitoring system 30 may also be configured to interchange the process data in encrypted fashion with the external data infrastructure 4. In this case, the configuration of the connecting unit 100 can comprise a configuration of the encryption.

The configuration of the first monitoring system 30 can also be used to stipulate the handling of the process data by the first monitoring system 30, in particular by the connecting unit 100 or the signal units 40, 41, 42, 43. This comprises settings regarding which process data are captured by the signal units 40, 41, 42, 43 and/or output to the signal units 40, 41, 42, 43. In addition, the configuration can possibly be used to stipulate the event whose occurrence is supposed to result in the interchange of the process data between the connecting unit 100 and the external data infrastructure 4.

The configuration of the first monitoring system 30 can also comprise the configuration of the field bus 102. By way of example, the configuration can be used to stipulate the times of the interchange of the process data, for example the first intervals of time for transmitting the data messages via the field bus 102.

For the configuration of the first monitoring system 30 via the external data network 7, an external computer 8 connected to the external data network 7 can access the connecting unit 100. In particular, the external computer 8 may have an access module 9 for accessing the connecting unit 100, which access module may be configured as a software application executed on the external computer 8, for example. The connecting unit 100 makes the data required for configuring the first monitoring system 30 available to the access module 9 as configuration data. The configuration data can comprise, inter alia, the parameters of the connecting unit 100, of the field bus 102 and/or the signal units 40, 41, 42, 43 which are adjustable during the configuration.

The configuration of the first monitoring system 30 can be effected using a website provided by the connecting unit 100 by the external data network 7, for example. In such a case, the access module 9 can comprise a web browser calling the website. The configuration of the first monitoring system 30 can also be effected by means of a direct data connection between the external computer 8 and the connecting unit 100 via the external data network 7. Alternatively or additionally, the configuration of the first monitoring system 30 can also be effected using network messages whose interchange between an application for configuring the connecting module 100, for example the access module 9, and the connecting module 100 is coordinated by the message distribution module 5.

Adaptation of the configuration of the first monitoring system 30 can also be effected on the basis of output process data transmitted from the external data infrastructure 4 to the connecting unit 100. By way of example, the data service 6 can take the processing of the input process data as a basis for producing output process data for transfer to the connecting unit 100 that are used to adapt the configuration of the connecting unit 100. This allows, by way of example, the second intervals of time, in which the process data are interchanged between the connecting unit 100 and the external data infrastructure 4, or the first intervals of time, in which the process data are interchanged between the connecting unit 100 and the signal units 40, 41, 42, 43, to be changed on the basis of the analysis of the input process data. This allows, by way of example, the intervals of time for transferring the process data to be shortened on the occurrence of a prescribed analysis result, and allows a more accurate analysis to be created on the basis of measured values captured in more close-meshed fashion.

The first monitoring system 30 is designed as a modular system. In particular, the signal units 40, 41, 42, 43 and the connecting unit 100 of the first monitoring system 30 are each configured as autonomous devices in separate housings and connected to the field bus 102. In other embodiments of the first monitoring system 30, it is also possible for fewer or more than the four signal units 40, 41, 42, 43 depicted in FIG. 1 to be connected to the field bus 102. In further alternative embodiments of the first monitoring system 30, the connecting unit 100 and the signal units 40, 41, 42, 43 connected thereto via the field bus 102 may also be arranged consistently in a shared housing. The first monitoring system 30, in particular the connecting unit 100, and the signal units 40, 41, 42, 43 may be embodied so as to be protected from dust and liquid, for example according to IP67.

Since both the installation signal units 24 and the signal units 40, 41, 42, 43 of the monitoring system 30 are configured to be connected to a field bus, the same type of signal units can be used for the installation signal units 24 and the signal units 40, 41, 42, 43. In particular, the installation signal units 24 and the signal units 40, 41, 42, 43 may each be of identical design, or the same signal units may be involved.

The connecting unit 100 may be configured to be connected in series with other connecting units, configured like the connecting unit 100, on the external data network 7. To this end, the connecting unit 100 can have two physical connections for connection to the external data network 7 and an integrated network switch, in order to forward network messages or data packets circulating on the external data network 7 from the one physical connection to the other physical connection. The connecting unit 100 can have an externally accessible switch arrangement configured to stipulate the network address of the connecting unit 100 in the external data network 7. The switch arrangement may be a DIP switch arrangement (dual inline package switch arrangement), for example.

In alternative embodiments of the first automation system 1, the external data network 7 and the installation field bus 14 may also be based on the same physical data network. By way of example, both the control data on the installation field bus 14 and the process data on the external data network 7 can be transmitted via the same Ethernet network. In this case, the installation field bus 14 may be configured as an EtherCAT field bus or as a Profibus, for example. Within the field bus cycles of the installation field bus 14, it is possible for periods for transmitting the process data to be reserved in this case, for example.

In alternative embodiments of the first automation system 1, the external data infrastructure 4 may also be configured as part of a computer system comprising the control unit 12. In particular, the data service 6 and the message distribution module 5, and also the control unit 12, can be executed on the same computer, for example an industrial PC.

In all of these embodiments, however, the first monitoring system 30 of the first automation system 1 is embodied so as to be functionally separate from the control system for process control, in particular functionally separate from the control unit 12 and the installation signal units 24 connected to the control unit 12 via the installation field bus 14. In this case, the control unit 12 and the installation signal units 24 can in particular form a realtime-compatible control system and may be coupled to one another via a realtime-compatible field bus. The connecting unit 100 of the monitoring system 30 and the external data infrastructure 4 can communicate with one another via the external data network without stipulated timings.

Figure 2:
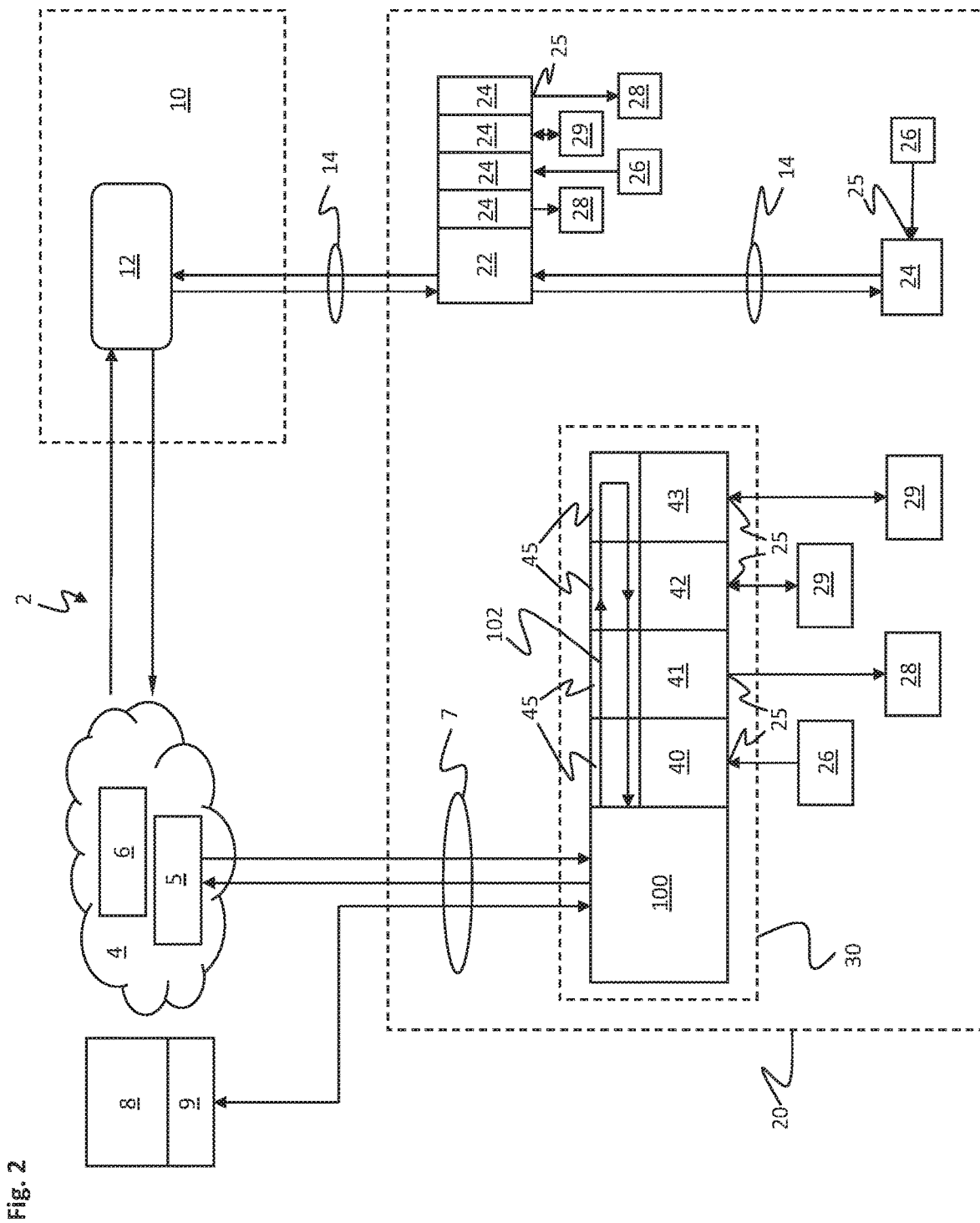
FIG. 2 shows a second automation system having the first monitoring system comprising the connecting unit.

FIG. 2 shows a second automation system 2. Unless differences are described below, the second automation system 2 is configured like the first automation system 1. In particular, the second automation system 2 comprises the control level 10 with the control unit 12 and the field level 20 with the installation signal units 24 and the monitoring system 30, which for its part comprises the connecting unit 100 and the signal units 40, 41, 42, 43.

In the second automation system 2, the control unit 12 is configured, like the connecting unit 100, to interchange data with the external data infrastructure 4. This can comprise sending data to the external data infrastructure 4 and receiving data from the external data infrastructure 4. The control unit 12 may be configured, by way of example, to interchange, as a further application, network messages with the external data infrastructure 4, in particular with the message distribution module 5. This can be effected in the same way as is described in connection with the connecting unit 100. In particular, the control unit 12, as what is known as a publisher and/or subscriber, can interchange network messages with the message distribution module 5.

If the external data infrastructure 4 provides output process data, the signal unit 12 of the second automation system 2, like the connecting unit 100, can retrieve the output process data from the external data infrastructure 4. The control unit 12 of the second automation system 2 can take the retrieved process data as a basis for influencing the automation process, for example. The control unit 12 can forward the output process data directly to the installation signal units 24 for actuating the actuators 28 or else can process the output process data further itself, for example.

The data sent from the control unit 12 of the second automation system 2 to the external data infrastructure 4 can be processed, for example analyzed, stored or otherwise dealt with, by the external data infrastructure 4, like the input process data sent by the connecting unit 100. In particular, the external data infrastructure 4 may be configured to logically combine the data of the control unit 12 and the input process data of the connecting unit 100 with one another. It is also possible for the output process data provided by the external data infrastructure 4 to be based both on the data of the control unit 12 and on the data of the connecting unit 100.

Figure 3:
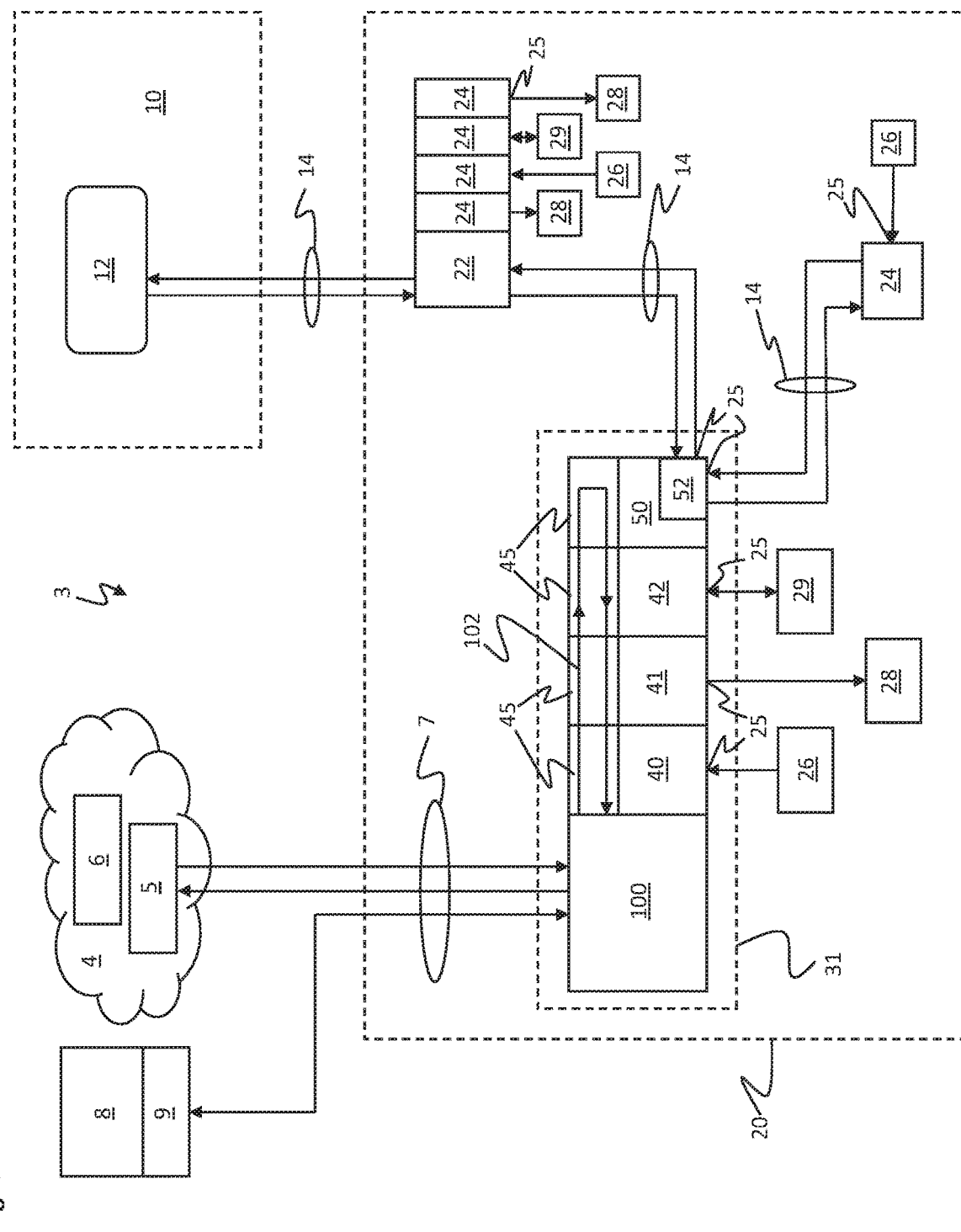
FIG. 3 shows a third automation system having a second monitoring system comprising the connecting unit.

FIG. 3 shows a third automation system 3. Unless differences are described below, the third automation system 3 is configured like the first automation system 1 or the second automation system 2. In particular, the third automation system 3 comprises the control level 10 with the control unit 12 and the field level 20 with the installation signal units 24.

The third automation system 3 comprises a second monitoring unit 31. Unless differences are described below, the second monitoring unit 31 is configured like the first monitoring unit 30. In particular, the second monitoring unit 31 comprises the connecting module 100 for connecting the second monitoring unit 31 to the external data network 7, and also the first signal unit 40, the second signal unit 41 and the third signal unit 42.

Instead of the further third signal unit 43, the second monitoring system 31 comprises a fourth signal unit 50. Like the signal units 40, 41, 42, 43, the fourth signal unit 50 is also connected to the field bus 102 of the second monitoring device 31 via a field bus interface 45. The field bus 102 can be used by the fourth signal unit 50 to interchange process data with the connecting unit 100 in the same way as the signal units 40, 41, 42, 43.

The fourth signal unit 50 has a field connection 25 that, in the case of the fourth signal unit, is configured as a second field bus interface 52. The second field bus interface 52 connects the fourth signal unit 50 to the installation field bus 14, which connects the control unit 12 to the installation signal units 24 in the third automation system 3. The installation field bus data circulating on the installation field bus 14 thus pass through the fourth signal unit 50.

The fourth signal unit 50 is configured to concurrently log the installation field bus data circulating on the installation field bus 14 as process data of the automation process and to provide them as input process data representing a state of the automation process. Moreover, the fourth signal unit 50 is configured to forward all or some of the concurrently logged installation field bus data as process data via the field bus 102 to the connecting unit 100, which can in turn send the process data to the external data infrastructure 4.

The concurrently logged installation field bus data and/or the installation field bus data forwarded as process data may be all the data circulating on the installation field bus, for example. The fourth signal unit 50 can concurrently log or forward only selected installation field bus data, in particular installation field bus data stipulated in a configuration of the connecting unit 100 or of the fourth signal unit 50, however. In particular, the concurrently logged data may be the control data comprising the measured values captured by the sensors 26 or control values determined for the actuators 28.

The fourth signal unit 50 may also be configured to concurrently log just error data and/or to forward them via the field bus 102. The error data may be data that relate to a malfunction in the installation field bus 14 or units connected to the installation field bus 14, for example in the signal units 24, in the sensors 26, actuators 28 and sensor-actuator units 29 connected to the signal units 24 or in the control unit 12.

The fourth signal unit 50 may also be configured to concurrently log or forward configuration data circulating on the installation field bus 14. The configuration data may be data that relate to the topology and/or the diagnosis of the installation field bus 14 or of the units connected to the installation field bus 14, for example.

The concurrent logging of the installation field bus data circulating on the installation field bus 14 by the fourth signal unit 50 is effected autonomously and independently of the control of the automation process by the control unit 12 and the installation signal units 24. In particular, the fourth signal unit 50 does not act as a field bus subscriber of the installation field bus 14. The fourth signal unit 50 is incorporated into the installation field bus 14 such that it is ignored during a configuration of the installation field bus 14 or during the creation of data messages for the installation field bus 14. The fourth signal unit 50 thus acts only as a passive monitor unit on the installation field bus 14.

The second monitoring system 31 of the third automation system 3 is, like the first monitoring system 30 of the first and second automation systems 1, 2, configured to be autonomous, in particular it is configured to read in and output the field signals autonomously and to concurrently log the installation field bus data circulating on the installation field bus 14 autonomously and independently and to provide them as process data for the interchange with the external data infrastructure 4. The connecting unit 100 of the second monitoring system 31 is also configured to prompt the interchange of the process data with the external data infrastructure 4 autonomously.

The second monitoring system 31 is functionally separate from and independent of the control system for process control, in particular the control unit 12 and the installation signal units 24 connected thereto via the installation field bus 14. The control system and the second monitoring system 31 are connected to one another merely via the fourth signal unit 50 connected to the installation field bus 14. In this case, the fourth signal unit 50 acts just as a passive monitor unit on the installation field bus 14 and, from the point of view of the control system, in particular from the point of view of the control unit 12 and the signal units 24, is not a field bus subscriber of the installation field bus 14.

Even if FIGS. 1 to 3 depict the control unit 12 and the associated units 22, 24 and the installation field bus 14 together with the first monitoring system 30, the external data infrastructure 4 and the external data network 7, this does not limit the invention to the effect that pursuance of the inventive teaching always also may require a control unit 12, the associated units 22, 24 and the installation field bus 14. Of the components depicted in FIGS. 1 to 3, for example, the automation system 1 according to the invention can also only comprise or consist of the monitoring system 30, which for its part comprises the connecting unit 100 and the signal units 40, 41, 42, 43, the external data infrastructure 4 and the external data network 7.

Figure 4:
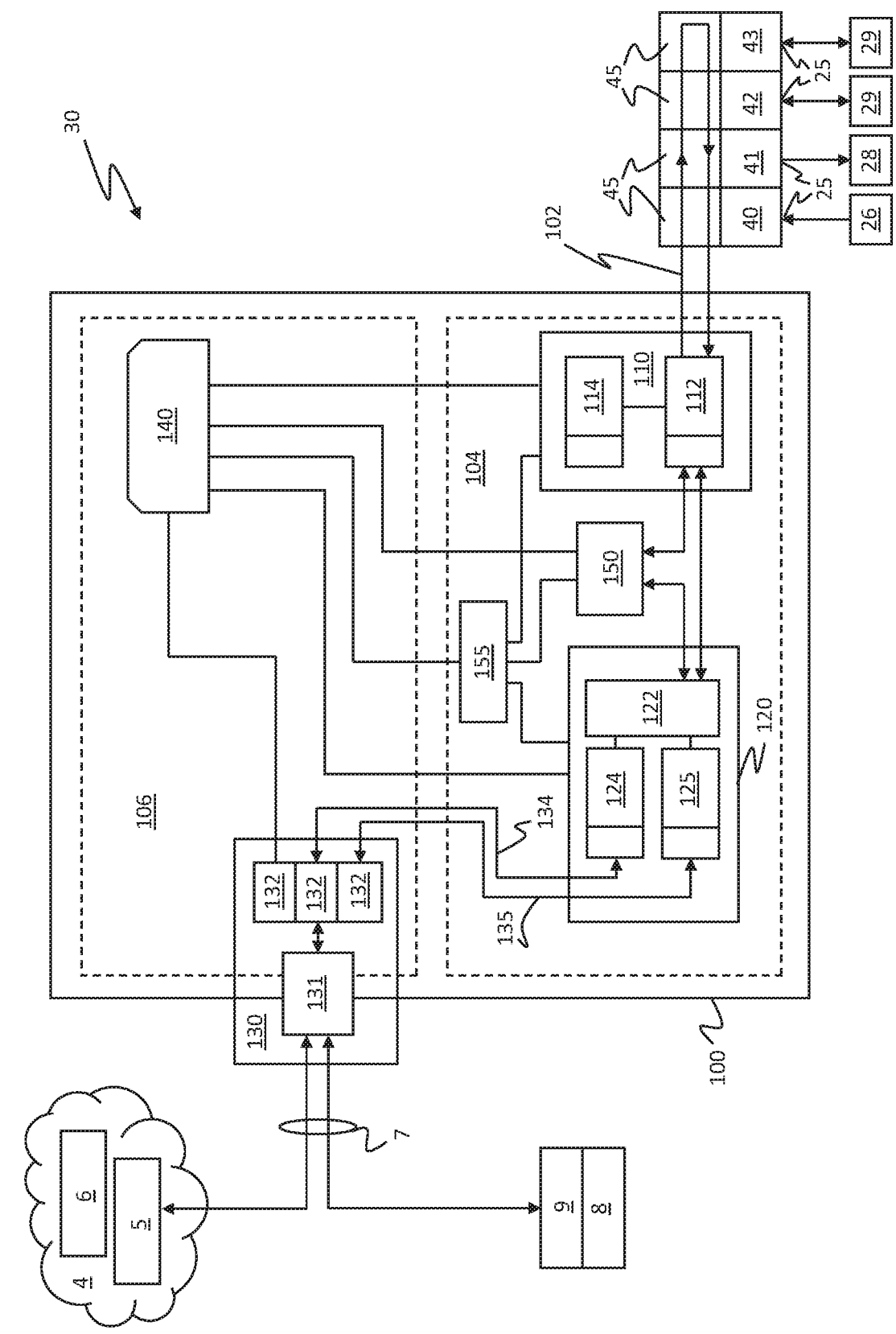
FIG. 4 shows the connecting unit in association with the first monitoring system.

FIG. 4 shows a detailed depiction of the connecting unit 100 in association with the first monitoring system 30. The connecting unit 100 comprises a field bus module 110, a network module 130 and an interface module 120.

The field bus module 110 is configured to be connected to the field bus 102, which connects the connecting unit 100 and the signal units 40, 41, 42, 43 to one another, and to interchange the process data with the signal units 40, 41, 42, 43. In this case, the field bus module 110 matches the field bus protocol used for communication on the field bus 102. If the field bus protocol is a protocol operating according to the master/slave system, the field bus module 110, as depicted in FIG. 4, can have a bus master 112.

The bus master 112 is configured to control the communication on the field bus 102, in particular the interchange of the process data between the signal units 40, 41, 42, 43 and the connecting unit 100. The bus master 112 can, to this end, create a data message and control a circulation of the data message via the field bus 102. By way of example, the creation of the data message by the bus master 112 and the circulation of the data message on the field bus 102 can be effected periodically in the stipulated first intervals of time.

The bus master 112 is configured to insert the output process data to be sent to the signal units 41, 42, 43 into the data message created. Moreover, the bus master 112 is configured to take the input process data inserted by the signal units 40, 42, 43 from the received data message. The bus master 112 can comprise an integrated semiconductor chip, for example an ASIC or an appropriately programmed FPGA. Alternatively or additionally, the bus master 112 can also comprise one or more software modules, for example a field bus driver, for example an EtherCAT driver.

The interface module 120 is connected to the field bus module 110 in order to interchange the output process data to be sent via the field bus 102 and the input process data received via the field bus 102 with the field bus module 110. Moreover, the interface module 120 is connected to the network module 130 in order to forward the input process data via the network module 130 to the external data infrastructure 4 and to retrieve the output process data via the network module 130 from the external data infrastructure 4.

The network module 130 is configured to interchange the process data via the external data network 7 with the external data infrastructure 4. For the interchange of the process data between the connecting unit 100 and the external data infrastructure 4, the network module 130 is configured to be connected to the external data network 7. To this end, the network module 130 comprises a physical interface, which may be configured as an Ethernet interface, for example.

The interface module 120 is configured to prompt the autonomous and independent interchange of the process data between the connecting unit 100 and the external data infrastructure 4. In particular, the interface module 120 can prompt the interchange of the process data periodically in the second intervals of time or under event control on the occurrence of the stored event. To this end, the interface module 120 may be configured to check the occurrence of the stored event.

For the interchange of the process data with the external data infrastructure 4, the interface module 120 can have a transmission module 124 and a reception module 125. The transmission module 124 is configured to prompt the autonomous sending of the process data via the external data network 7, for example in the form of the provided network messages, as part of the interchange of the process data. The sending of the process data can be prompted by the transmission module 124, by way of example, by virtue of it using the network module 130 to open a transmission channel 134 via which the process data can be transmitted. The transmission module 124 can transfer the network messages having the process data to the message distribution module 5 for further distribution. In that case, the transmission module 124 can act as what is known as a publisher.

The reception module 125 is configured to prompt the autonomous receiving of the process data via the external data network 7, for example in the form of the retrieved network messages, as part of the interchange of the process data. Reception of the process data can be prompted by the reception module 125, by way of example, by virtue of it using the network module 130 to open a reception channel 135 via which the process data can be transmitted. The reception module 125 can retrieve the network messages having the process data from the message distribution module 5. In that case, the reception module 125 can act as what is known as a subscriber. If no bidirectional interchange of the process data with the external data infrastructure 4 is effected, the interface module 120 can also comprise just the transmission module 124 or just the reception module 125.

For communication via the external data network 7, in particular for the interchange of the process data, the network module 130, as shown in FIG. 4, can make one or more network sockets 132 available. The network sockets 132 form an interface to the external data network 7 within the connecting unit 100. In particular, the network sockets 132 can provide a software interface in addition to the physical interface 131. The transmission module 134 is configured to open the transmission channel 134 via one of the network sockets 132 of the network module 130 autonomously. Similarly, the reception module 125 is configured to open the reception channel 135 via a further one of the network sockets 132 autonomously.

The connecting unit 100 can comprise a realtime system 104 and an application system 106. The realtime system 104 can provide a realtime environment for executing time-critical modules of the connecting unit 100. By way of example, the realtime system 104 can provide an environment for realizing hard realtime requirements. Inter alia, it is certain that the modules that the realtime system 104 comprises end tasks executed by them or provide, receive or forward data within prescribed times. In the connecting unit 100, the realtime system 104 comprises the field bus module 110 and the interface module 120, inter alia, so that the interchange of the process data between the field bus module 110 and the interface module 120 can be effected within the realtime environment. The realtime system 104 may be a TwinCAT system and the application system 106 may be a Windows system, for example.

The application system 106 comprises all the modules of the connecting unit 100 whose execution timing is uncritical, in particular modules that can end tasks or provide, receive or forward data at variable times. In the connecting unit 100, the application system 106 comprises the network module 130, inter alia. Thus, the interface module 120 is configured, as a module executed in the realtime environment 104, to open the transmission channel 134 and the reception channel 135 directly via the network module 130 executed in the application environment 106. In particular, the interface module 120 is configured to open the network sockets 132 of the network module 130 executed in the application system 106 from the realtime environment 104 directly.

The connecting unit 100, in particular the field bus module 110, may be configured to transmit the process data in a field bus data format via the field bus 102. The field bus data format may be a binary data format or a plain text data format, for example. The field bus data format may be stipulated by the field bus protocol implemented on the field bus 102.

The connecting unit 100, in particular the network module 130, may be configured to interchange the process data in a network data format via the external data network 7. The network data format may be different than the field bus data format or else consistent with the field bus data format. The network data format may likewise be a plain text data format or a binary data format. By way of example, the network data format may be the JSON data format.

To convert the data formats, the connecting unit 100, as depicted in FIG. 4, can have a conversion module 122. By way of example, the conversion module 122 may be part of the interface module 120. The conversion module 122 is configured to convert the process data between the field bus data format and the network data format. The conversion module 122 may be configured as part of the realtime system 104 of the connecting unit 100.

The connecting unit 100 can, as likewise depicted in FIG. 4, comprise a memory module 150. The memory module 150 is configured to buffer-store the process data in the connecting unit 100 before forwarding via the external data network 7 and/or before forwarding via the field bus 102. The memory module 150 can buffer-store the process data in particular if the field bus module 110 is set up to periodically interchange the process data via the field bus 102 in the first intervals of time, and the interface module 120 is set up to periodically interchange the process data via the external data network 7 in the second intervals of time or under event control.

The connecting unit 100 may also be configured to buffer-store the process data in the memory module 150 if the connection to the external data infrastructure 4 via the external data network 7 is broken. The stored process data can then be collectively transmitted to the external data infrastructure 4 via the external data network 7 after restoration of the connection. Alternatively or additionally, the process data can also be both stored in the memory module and forwarded via the external data network 7 at the same time.

The memory module 150 can comprise a ring buffer in which all the process data received from the field bus module 110 are inserted. In that case, the oldest process data each time can be overwritten when the memory module 150 is full. The memory module 150 can comprise, by way of example, a memory card integrated or able to be plugged into the connecting unit 100, for example as an SD card. The memory module 150 can also comprise a memory chip integrated into the connecting unit.

In alternative embodiments of the connecting unit 100, the process data can also pass through the memory module 150, the conversion module 152 and the interface module 120 in a different order than the one depicted in FIG. 4. By way of example, the process data can initially be converted in the conversion module 122 following reception via the field bus module 110 and subsequently stored in the memory module 150.

The connecting unit 100 can also have a realtime clock 155, as depicted in FIG. 4. The realtime clock 155 is configured to make a time signal available to the modules of the connecting unit 100. The time signal may be a current time of day, for example. By way of example, the realtime clock 155 can make its time signal available to the field bus module 110, the interface module 120 and/or the memory module 150. The realtime clock 155 may be configured to be synchronized to a reference time from the external data network 7 via the network module 130. The synchronization can be effected by means of the SNTP protocol, for example.

The time signal of the realtime clock 155 can be added to the process data as a time stamp after reception via the field bus 102 and before forwarding to the external data infrastructure 4 via the interface module 120 and the network module 130, for example. The addition of the time stamp can be effected before storage of the process data in the memory module 150, in particular. The realtime clock 155 may be configured as part of the realtime system 104 of the connecting unit 100.

To protect the interchange via the external data network 7, the connecting unit 100 can comprise a security module. The security module may have keys or passwords used for the encryption, for example, stored and managed in it. The security module can also provide services for encrypting and decrypting the process data. The encryption module may be a TPM chip (trusted platform module chip), for example.

To configure the first monitoring system 30, the connecting unit 100 comprises a server module 140. The server module 140 is connected to the network module 130 and configured to make the configuration data needed for configuring the first monitoring unit 30 available to the access module 9 of the external computer 8 via the external data network 7. The server module 140 may be configured as a web server, for example, which makes the configuration data available via a website that is retrievable by the access module 9 as a browser. Alternatively or additionally, the server module 140 may also be configured to make the configuration data available via a direct data connection, for example in the form of network messages. To connect to the external data network, the server module 140, like the interface module 120, is configured to set up a connection to one of the network sockets 132 provided by the network module 130.

The connecting unit 100 is configured to configure the first monitoring system 30 on the basis of the configuration data. Changing the configuration data allows the configuration of the first monitoring system 30 to be changed by the access module 9 of the external computer 8 via the server module 140. In particular, the server module 140 of the connecting unit 100 can be used to configure the interface module 120, the memory module 150 and the field bus module 110 with the field bus 102 and the signal units 40, 41, 42, 43.

The configuration of the memory module 150 comprises, inter alia, settings for the buffer-storage of the process data, for example times and durations of the buffer-storage and times of the forwarding of the stored process data to the external data infrastructure 4. As part of the configuration of the interface module 120, it is possible, inter alia, to stipulate the address of the external data infrastructure 4, the protocols and access data used for communication with the external data infrastructure 4, the certificates and passwords used for protecting the communication and the manner of the interchange of the process data with the external data infrastructure 4.

By way of example, the process data to be forwarded to the external data infrastructure 4 or to be retrieved from the external data infrastructure 4, and the times of the data interchange and possibly the event triggering the interchange of the process data, can be stipulated by means of the configuration of the interface module 120. It is also possible for the network data format used for the interchange with the external data infrastructure 4, such as a binary data format or a plain text format such as the JSON format, to be selected by means of the configuration of the interface module 120.

The field bus module 110 comprises not only the bus master 112 but also a configuration module 114. The configuration module 114 is configured to provide the configuration data for the field bus module 110, the field bus 102 and the signal units 40, 41, 42, 43. By way of example, the configuration module 114 may be configured so as, after the first monitoring system 30 is equipped with the signal units 40, 41, 42, 43 for the first time, to ascertain the configuration data relating to the field bus 102 and the signal units 40, 41, 42, 43 and to make said configuration data available to the server module 140.

The configuration module 114 is configured to prompt querying of the signal units 40, 41, 42, 43 connected to the field bus 120 by the bus master 112. The querying by the bus master 112 can result in the signal units 40, 41, 42, 43 being prompted to transfer their current configuration data to the bus master 112 and the configuration module 114. By way of example, the signal units 40, 41, 42, 43 can insert their configuration data into the data message circulating on the field bus 102 and the bus master 112 can forward the received configuration data to the configuration module 114. The configuration module 114 then transfers the configuration data to the server module 140. The configuration data transferred from the configuration module 114 to the server module 140 can, inter alia, comprise a number of the signal units connected to the field bus 102, in each case the type of the signal units or a number or type of the field connections present on the signal units. The configuration module 114 is also configured so as, after a change in the configuration data, to forward the changed configuration data from the server module 140 to the bus master 112 or the signal units 40, 41, 42, 43.

Before the monitoring systems 30, 31 are started up, the connecting unit 100 is connected to the signal units 40, 41, 42, 43, 50 via the field bus 102. After the monitoring systems 30, 31 are started up, the configuration data of the field bus 102 and of the signal units 40, 41, 42, 43, 50 can be read into the connecting unit 100, for example by the configuration module 114 of the field bus module 110. After the connecting unit 100 is connected to the external data network 7, the access module 9 of the external computer 8 connected to the external data network 7 can be used to access the configuration data of the monitoring systems 30, 31, in particular the configuration data of the field bus 102 and of the signal units 40, 41, 42, 43, 50. The access can be effected via the website made available by the server module 140, for example.

The access module 9 of the external computer 8 can be used to change the provided configuration data for configuring the monitoring system 30, 31. After the configuration data are returned to the modules and units of the monitoring systems 30, 31, in particular to the modules of the connecting unit 100 and to the signal units 40, 41, 42, 43, 50, the monitoring systems 30, 31 are configured for the interchange of the process data between the signal units 40, 41, 42, 43, 50 and the external data infrastructure 4.

Since the connecting unit 100 of the monitoring systems 30, 31 is configured to interchange the process data with the external data infrastructure autonomously and independently of the control of the automation processes controlled by the automation systems 1, 2, 3, in particular independently of the control unit 12, the monitoring systems 30, 31 can be easily and inexpensively integrated into the automation systems 1, 2, 3 or retrofitted into existing automation systems. In particular, they can easily and inexpensively be retrofitted on existing installations, machines or buildings. The monitoring systems 30, 31 provide an autonomous solution, independent of the controller 12, for capturing and distributing the process data.

The possibility of using universal protocols for the interchange of the process data via the external data network 7 allows the monitoring systems 30, 31 and the connecting unit 100 to be used both in public and in self-contained external data networks, both worldwide and local. In the external data infrastructure 4, it is possible for a multiplicity of data services for analysis, statistical evaluation, processing, monitoring or visualization of the process data to be executed. Moreover, the data services can be used to send notifications via the external data network 7 on the basis of the incoming process data, for example for the purpose of requesting maintenance or repair.

This invention has been described with respect to exemplary embodiments. It is understood that changes can be made and equivalents can be substituted to adapt these disclosures to different materials and situations, while remaining with the scope of the invention. The invention is thus not limited to the particular examples that are disclosed, but encompasses all the embodiments that fall within the scope of the claims.

What is claimed is:

1. A connecting unit for transmitting process data of an automation process of an automation system to an external data infrastructure, wherein the connecting unit is configured as a field device for arrangement on a field level of the automation system and comprises a field bus module, a network module and an interface module, and wherein the connecting unit forwards process data without logically combining the process data to control the automation process;

wherein the field bus module is connectable to a field bus and is configured to interchange the process data via the field bus with a plurality of signal units, the plurality of signal units being connected to sensors and actuators of the automation process via field connections, the process data interchanged comprising input process data transmitted from the plurality of signal units and output process data transmitted to the plurality of signal units, the input process data representing measured values captured by the sensors and transmitted from the sensors to the plurality of signal units via the field connections, the output process data representing control values for the actuators and transmitted from the plurality of signal units to the actuators via the field connections;

wherein the network module is connectable to an external data network and is configured to interchange the process data via the external data network with an external data infrastructure and in so doing to use the external data network to transmit the input process data to the external data infrastructure and to retrieve the output process data from the external data infrastructure;

wherein the interface module is connected to the network module and to the field bus module for an interchange of the process data between the field bus module and the network module, the interface module being configured to prompt the interchange of the process data between the network module and the external data infrastructure via the external data network autonomously; and wherein the external data infrastructure is configured to provide at least one data-based service that processes the input process data transmitted from the plurality of signal units to the external data infrastructure via the connecting unit into the output process data to be transmitted from the external data infrastructure to the plurality of signal units via the connecting unit, the at least one data-based service of the external data infrastructure logically combining the input process data in order to produce the output process data, said output process data being used for controlling the automation process.

2. The connecting unit according to claim 1, wherein the input process data depict a state or a physical parameter of the automation process and the output process data depict a state or a physical parameter of the automation process.

3. The connecting unit according to claim 1, wherein the interface module comprises a transmission module and wherein the transmission module is configured to prompt the transmission of the input process data by opening a transmission channel via the network module, in order to prompt sending of a network message comprising the input process data.

4. The connecting unit according to claim 3, wherein the transmission module is configured to transfer the network message with the input process data to a message distribution module of the external data infrastructure for distribution to a receiver of the network message.

5. The connecting unit according to claim 4, wherein the message distribution module acts as message-oriented middleware and the transmission module acts as a publisher.

6. The connecting unit according to claim 1, wherein the interface module comprises a reception module and wherein the reception module is configured to prompt retrieval of the output process data by opening a reception channel via the network module, in order to prompt reception of a network message comprising the output process data.

7. The connecting unit according to claim 6, wherein the reception module is configured to retrieve the network message with the output process data from a message distribution module of the external data infrastructure.

8. The connecting unit according to claim 7, wherein the message distribution module acts as message-oriented middleware and the reception module acts as a subscriber.

9. The connecting unit according to claim 1, having a realtime system for executing time-critical modules of the connecting unit and an application system for executing non-time-critical modules of the connecting unit, wherein the realtime system comprises the interface module and the field bus module and the application system comprises the network module.

10. The connecting unit according to claim 1, wherein the interface module is configured to prompt the interchange of the process data periodically and/or on the occurrence of an event stored in the connecting unit.

11. The connecting unit according to claim 1, wherein the field bus module is configured to interchange the process data via the field bus periodically with the signal unit.

12. The connecting unit according to claim 1, wherein the field bus module comprises a configuration module configured to prompt polling of the signal unit connected to the field bus and to make configuration data relating to the signal unit available.

13. The connecting unit according to claim 1, having a server module, wherein the server module is connected to the network module and is configured to make configuration data of the connecting unit available to an access module of an external computer connected to the network module via the external data network, and wherein the connecting unit is configured to configure the field bus module and/or the field bus and/or the signal unit and/or the interface module on the basis of the configuration data.

14. The connecting unit according to claim 1, having a conversion module, wherein the field bus module is configured to interchange the process data in a field bus data format via the field bus;

wherein the network module is configured to transmit the process data in a network data format via the external data network; and wherein the conversion module is configured to convert the process data between the field bus data format and the network data format.

15. The connecting unit according to claim 1, having a memory module configured to buffer-store the process data after reception via the field bus and before sending via the external data network.

16. A monitoring system for arrangement on a field level of an automation system having:

a connecting unit for transmitting process data of an automation process of the automation system via an external data network to an external data infrastructure, the connecting unit being configured as a field device and is configured to be connected via a network module of the connecting unit to the external data network; and a signal unit, the signal unit being configured to be connected to the automation process via a field connection;

wherein a field bus interface of the signal unit is configured to be connected via a field bus to a field bus module of the connecting unit for the purpose of interchange of the process data;

wherein an interface module of the connecting unit is configured to be connected to the field bus module of the connecting unit and to the network module of the connecting unit and is further configured to interchange the process data between the field bus module and the network module, the interface module being configured to prompt the interchange of the process data between the network module and an external data infrastructure via the external data network autonomously, and in so doing to use the external data network to transmit input process data to the external data infrastructure and to retrieve output process data from the external data infrastructure, the output process data being used for controlling the automation process;

wherein a server module of the connecting unit is configured to be connected to the network module of the connecting unit and is further configured to make configuration data of the connecting unit available to an access module of the external data infrastructure; and wherein the connecting unit forwards the process data without logically combining the process data to control the automation process.

17. The monitoring system according to claim 16, wherein the field connection of the signal unit is configured as a further field bus interface and wherein the further field bus interface is configured to be connected to an installation field bus of the automation system, in order to concurrently log installation field bus data interchanged on the installation field bus as process data.

18. A method for operating an automation system having a connecting unit for transmitting process data of the automation system between a plurality of signal units and an external data infrastructure, the plurality of signal units being connected to sensors and actuators of an automation process of the automation system via field connections, the process data comprising input process data transmitted from the plurality of signal units and output process data transmitted to the plurality of signal units, the input process data representing measured values captured by the sensors and transmitted from the sensors to the plurality of signal units via the field connections, and the output process data representing control values for the actuators and transmitted from the plurality of signal units to the actuators via the field connections;

the method comprising the following steps:

interchanging the process data between the connecting unit and the plurality of signal units via a field bus; and autonomously prompting an interchange of the process data between the connecting unit and an external data infrastructure via an external data network by the connecting unit, wherein the connecting unit transmits the input process data to the external data infrastructure and retrieves the output process data from the external data infrastructure, wherein the interchange of the process data is prompted by means of provision and/or by means of retrieval of a network message comprising the process data by the connecting unit, wherein the connecting unit forwards the process data without logically combining the process data to control the automation process, and wherein the external data infrastructure provides at least one data-based service that processes the input process data transferred from a network module to the external data infrastructure via the external data network into the output process data to be transferred from the external data infrastructure to the network module via the external data network, the at least one data-based service logically combining the input process data in order to produce the output process data, said output process data being used for controlling the automation process.

19. The method according to claim 18, wherein the method comprises the further steps of:

creating the input process data, representing a state of the automation process executed by the automation system, in the signal unit;

transmitting the input process data as process data from the signal unit to the connecting unit as part of the interchange of the process data via the field bus; and transmitting the process data from the connecting unit to the external data infrastructure as part of the interchange of the process data via the external data network.

20. The method according to claim 19, wherein the method comprises the further steps of:

the signal unit concurrently logging installation field bus data circulating on an installation field bus connected to the signal unit; and providing the concurrently logged installation field bus data as the input process data representing a state of the automation process in the signal unit.

21. The method according to claim 18, comprising the further steps of:

the external data infrastructure providing the output process data as process data; and the connecting unit retrieving the output process data from the external data infrastructure as part of the interchange of the process data via the external data network.

22. The method according to claim 21, wherein the method comprises the further steps of:

transmitting the output process data from the connecting unit to the signal unit as part of the interchange of the process data via the field bus; and the signal unit influencing the automation process on the basis of the output process data.

23. The method according to claim 21, comprising the further step of: adapting the configuration of the connecting unit on the basis of the output process data retrieved by the connecting unit.

24. The method according to claim 18, comprising the further steps of:

the external data infrastructure providing the output process data as process data;

a control unit of the automation system retrieving the output process data from the external data infrastructure; and the control unit influencing the automation process on the basis of the output process data.

* * * * *